(12) United States Patent
Cai et al.

(10) Patent No.: US 8,976,780 B2
(45) Date of Patent: Mar. 10, 2015

(54) UPLINK TIMING MAINTENANCE UPON TIME ALIGNMENT TIMER EXPIRY

(71) Applicant: Research In Motion Limited, Waterloo (CA)

(72) Inventors: Zhijun Cai, Euless, TX (US); Andrew Mark Earnshaw, Kanata (CA); Takashi Suzuki, Ichikawa (JP)

(73) Assignee: BlackBerry Limited, Waterloo, Ontario (CA)

(*) Notice: Subject to any disclaimer, the term of this patent is extended or adjusted under 35 U.S.C. 154(b) by 92 days.

(21) Appl. No.: 13/767,669

(22) Filed: Feb. 14, 2013

(65) Prior Publication Data

US 2014/0086161 A1 Mar. 27, 2014

Related U.S. Application Data (60) Provisional application No. 61/706,689, filed on Sep. 27, 2012.

(51) Int. Cl.

| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04B 7/00 | (2006.01) | |
| H04J 3/08 | (2006.01) | |

(Continued)

(52) U.S. Cl.
CPC ........ *H04W 72/042* (2013.01); *H04W 56/0045* (2013.01)

USPC ........... 370/350; 370/216; 370/252; 370/312; 370/328; 370/329; 370/330; 370/331; 370/336

(58) Field of Classification Search
USPC ......... 370/216, 252, 312, 328, 329, 330, 331, 370/336, 350

See application file for complete search history.

(56) References Cited

U.S. PATENT DOCUMENTS

2010/0177747 A1* 7/2010 Chun et al. ............ 370/336
2010/0284376 A1* 11/2010 Park et al. ............. 370/336

(Continued)

FOREIGN PATENT DOCUMENTS

| EP | 2408243 | 1/2012 |
|---|---|---|
| WO | 2010/092422 | 8/2010 |

OTHER PUBLICATIONS

3GPP, TS 36.213: LTE; Evolved Universal Terrestrial Radio Access (E-UTRA); Physical layer procedures; Jun. 26, 2012, ETSI, Version 10.6.0 Release 10, p. 8-10.*

(Continued)

*Primary Examiner* — Benjamin H Elliott, IV
*Assistant Examiner* — Eric Nowlin
(74) *Attorney, Agent, or Firm* — Fish & Richardson P.C.

(57) ABSTRACT

Systems, apparatuses, and methods for uplink timing maintenance in wireless communications are provided. Certain aspects of the disclosure involve, at a user equipment (UE), detecting a downlink transmission timing has changed by an amount of time. The UE may determine that a time alignment timer (TAT) is not running or determine the downlink transmission timing change is not compensated for. The UE can adjust a timing advance based on the amount of time that the downlink transmission timing has changed.

15 Claims, 9 Drawing Sheets

(51) Int. Cl.
  *H04J 3/00*   (2006.01)
  *H04J 3/06*   (2006.01)
  *H04W 72/04*  (2009.01)
  *H04W 56/00*  (2009.01)

(56) References Cited

U.S. PATENT DOCUMENTS

| | | | |
|---|---|---|---|
| 2011/0158116 A1* | 6/2011 | Tenny et al. | 370/252 |
| 2012/0008600 A1* | 1/2012 | Marinier et al. | 370/336 |
| 2012/0014371 A1* | 1/2012 | Weng et al. | 370/350 |
| 2012/0087328 A1* | 4/2012 | Park et al. | 370/329 |
| 2012/0257569 A1* | 10/2012 | Jang et al. | 370/328 |
| 2013/0028204 A1* | 1/2013 | Dinan | 370/329 |
| 2013/0028239 A1* | 1/2013 | Dinan | 370/336 |
| 2013/0121315 A1* | 5/2013 | Langereis et al. | 370/336 |

OTHER PUBLICATIONS

3GPP TS 36.211 V10.4.0; 3rd Generation Partnership Project; Technical Specification Group Radio Access Network; Evolved Universal Terrestrial Radio Access (E-UTRA); Physical Channels and Modulation (Release 10); Dec. 2011; 101 pages.
3GPP TS 36.213 V10.4.0; 3rd Generation Partnership Project; Technical Specification Group Radio Access Network; Evolved Universal Terrestrial Radio Access (E-UTRA); Physical Layer Procedures (Release 10); Dec. 2011; 125 pages.
3GPP TS 36.133 V10.6.0; 3rd Generation Partnership Project; Technical Specification Group Radio Access Network; Evolved Universal Terrestrial Radio Access (E-UTRA); Requirements for Support of Radio Resource Management (Release 10); Mar. 2012; 567 pages.
3GPP TS 36.321 V10.6.0; 3rd Generation Partnership Project; Technical Specification Group Radio Access Network; Evolved Universal Terrestrial Radio Access (E-UTRA); Medium Access Contro (MAC) Protocol Specification (Release 10); Sep. 2012; 54 pages.
3GPP TS 36.321 V11.0.0; 3rd Generation Partnership Project; Technical Specification Group Radio Access Network; Evolved Universal Terrestrial Radio Access (E-UTRA); Medium Access Control (MAC) Protocol Specification (Release 11); Sep. 12, 2012; 55 pages.
3GPP TS 36.331 V10.5.0; 3rd Generation Partnership Project; Technical Specification Group Radio Access Network; Evolved Universal Terrestrial Radio Access (E-UTRA); Radio Resource Control (RRC); Protocol Specification (Release 10); Mar. 2012; 302 pages.
ASUSTeK; "PDCCH Monitoring in UL Unsynchronized State"; R2-120361; 3GPP TSG-RAN WG2 Meeting #77; Dresden, Germany; Feb. 6-10, 2012; 6 pages.
Catt; "Consideration on Multi-TA Capability"; R2-121140; 3GPP TSG RAN WG2 Meeting #77bis; Jeju, Korea; Mar. 26-30, 2012; 1 page.
Ericsson, ST-Ericsson; "Timing Advance Value Upon Timing Advance Timer Expiry"; R2-122585; 3GPP TSG-RAN WG2 #78; Prague, Czech Republic, May 21-25, 2012; 2 pages.
Ericsson, ST-Ericsson; "Clarification of TA Value Maintenance at TA Timer Expiry"; R2-124273; 3GPP TSG-RAN WG2 Meeting #79; Qingdao, P.R. China, Aug. 13-17, 2012; 2 pages.
"ETSI TS 136 213 V10.1.0; LTE Evolved Universal Terrestrial Radio Access (E-UTRA); Physical Layer Procedures (3GPP TS 36.213 version 10.1.0 Release 10)"; Apr. 1, 2011; 117 pages.
Research in Motion UK Limited et al.; "Handling Time Advance Command When TAT Is Not Running"; 3GPP TSG-RAN WG2 Meeting #77bis (R2-121283); Jeju, South Korea; Mar. 26-30, 2012; 2 pages.
Research in Motion UK Limited; "Adjustment of Time Advance When Tat Is Not Running"; 3GPP TSG-RAN WG2 Meeting #79bis (R2-124460); Bratislava, Slovakia; Oct. 8-13, 2012; 4 pages.
International Search Report and Written Opinion of the International Searching Authority issued on Sep. 12, 2013; 10 pages.

* cited by examiner

UPLINK TIMING MAINTENANCE UPON TIME ALIGNMENT TIMER EXPIRY

CLAIM OF PRIORITY

This application claims priority under 35 USC §119(e) to U.S. patent application Ser. No. 61/706,689, filed on Sep. 27, 2012, the entire contents of which are hereby incorporated by reference.

BACKGROUND

This disclosure relates to uplink timing maintenance in wireless communication systems.

Wireless communication systems can include a network of one or more base stations to communicate with one or more wireless devices such as fixed and mobile wireless communication devices, mobile phones, or laptop computers with wireless communication cards. Base stations can emit radio signals that carry data such as voice data and other data content to wireless devices. A base station can transmit a signal on a downlink (DL), to one or more wireless devices. A wireless device can transmit a signal on an uplink (UL), to one or more base stations.

The uplink signals from multiple wireless devices may go through different paths and experience different propagation delays to arrive at one base station. The base station may need to control the transmission timing of the wireless devices such that the uplink signals from multiple wireless devices are time aligned when the signals arrive at the base station. An absence of time alignment may cause significant interference to other uplink users. One of the main purposes of time alignment is to counteract different propagation delays among multiple wireless devices.

DETAILED DESCRIPTION

Certain aspects of the disclosure are directed to systems, methods, and apparatuses for providing uplink timing maintenance in wireless communication systems.

One aspect features a method, performed at a User Equipment (UE) of a wireless communications network, includes determining that a time alignment timer (TAT) is not running; and stopping adjustment of uplink transmission timing based on the determination that the time alignment timer is not running.

In some examples, the method further includes determining that the time alignment timer is running; and starting adjustment of the uplink transmission timing based on the determination that the time alignment timer is running.

In some implementations, the method further includes receiving a timing advance command (TAC); applying the TAC; and starting the TAT based on the TAC. In some examples, the TAC is received in a TAC Medium Access Control (MAC) control element (CE).

In another example, the method includes receiving a timing advance command; determining that a contention resolution is unsuccessful; stopping the time alignment timer based on the determination that the contention resolution is unsuccessful; and stopping adjustment of the uplink transmission timing. In some implementations, the timing advance command is received in a random access response message.

In yet another example, the method includes determining that the TAT has expired; and stopping adjustment of the uplink transmission timing based on the determination that the TAT has expired.

In some implementations, the time alignment timer is configurable to control how long the UE is considered uplink time aligned.

These general and specific aspects may be implemented using a method, a user equipment, or any combination of methods and user equipment.

Certain implementations are directed to systems, user equipment (UE), and methods performed at a UE of a wireless communications network. The implementations may include detecting that a downlink transmission timing has changed by an amount of time, determining that a time alignment timer (TAT) is not running or determining that the downlink transmission timing change is not compensated for, and adjusting a timing advance based on the amount of time that the downlink transmission timing has changed.

Upon expiration of the TAT, certain implementations may include storing the timing advance.

In some implementations, adjusting the stored timing advance may be based on the amount of time that downlink transmission timing has changed. The TAT may be started upon application of the TAC received in the timing advance command (TAC) medium access control (MAC) control element (CE). Some implementations may also include adjusting the uplink transmission timing to a new uplink transmission timing that is equal to the sum of a stored timing advance and the adjusted timing advance.

In certain implementations, determining that the TAT is not running may include determining that the TAT has expired.

Certain implementations may include applying the adjusted timing advance to an uplink transmission timing.

Certain implementations may provide various advantages. For example, uplink timing error and UE battery consumption can be reduced.

Figure 1:
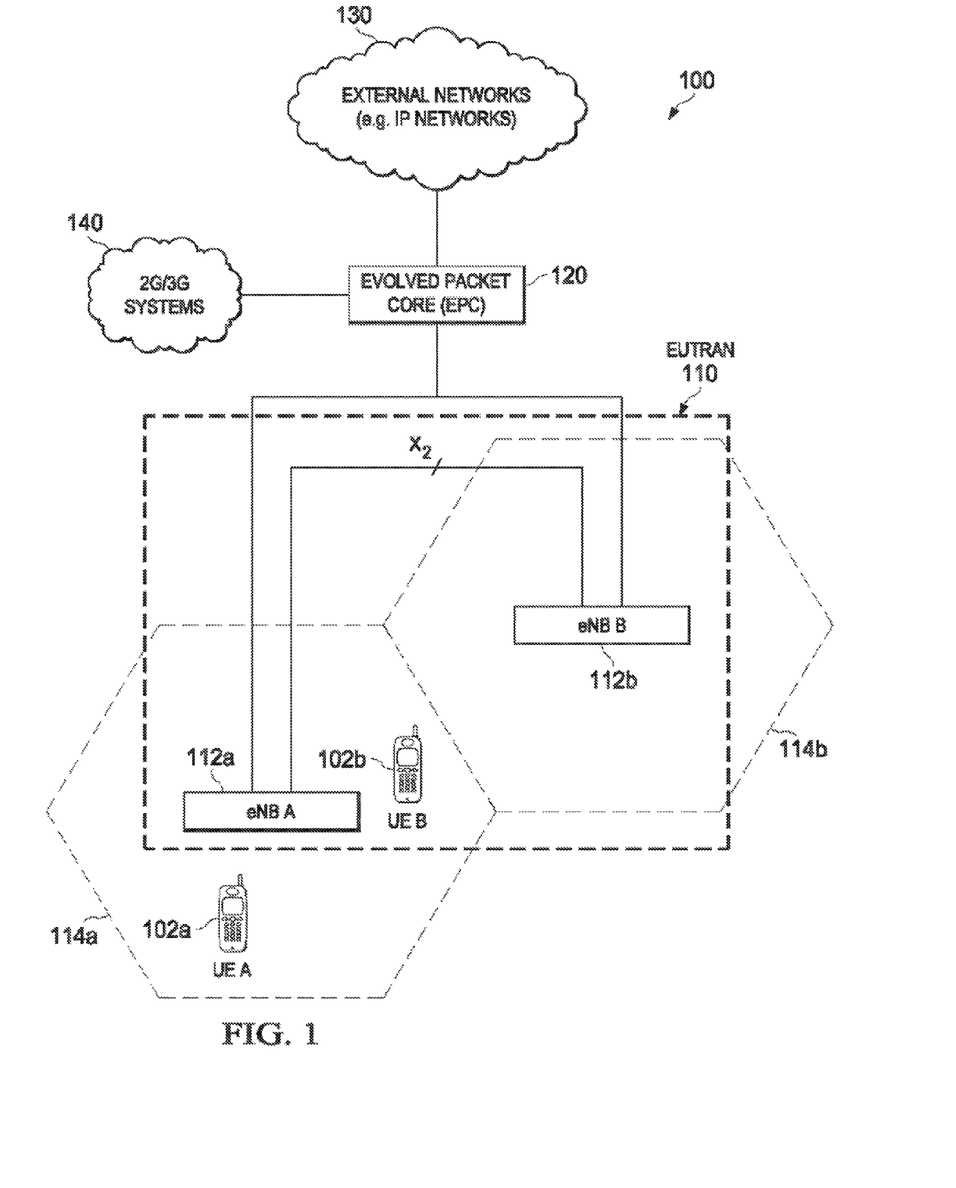
FIG. 1 is a schematic block diagram of an example wireless communication system.

FIG. 1 is a schematic block diagram of an example mobile communication system 100. The mobile communication system 100 shown in FIG. 1 may include one or more network nodes (e.g., 112*a* and 112*b*). It will be understood that the network node may take several forms in a mobile communication system, such as (but not limited to) an evolved Node B (eNB), a base station, a Node B, a wireless access point, a radio network controller, a base transceiver station, a layer two relay node, a layer three relay node, a femto cell, home evolved Node B (HeNB), a home Node B (HNB), a base station controller, or other network node that includes radio resource control. In the long term evolution (LTE) example of FIG. 1, the network nodes are shown as evolved Node Bs (eNBs) 112a and 112b. The example mobile communication system 100 of FIG. 1 may include one or more radio access networks 110, core networks (CNs) 120, and external networks 130. In certain implementations, the radio access networks 110 may be Evolved Universal Mobile Telecommunications System (UMTS) terrestrial radio access networks (E-UTRAN). In addition, in certain instances, core networks 120 may be evolved packet cores (EPCs). Further, there may be one or more mobile electronic devices 102a, 102b operating within the mobile communication system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the mobile communication system 100.

The wireless communication system may communicate with wireless devices 102a and 102b using a wireless technology such as one based on orthogonal frequency division multiplexing (OFDM), Orthogonal Frequency Division Multiple Access (OFDMA), Single Carrier Frequency Division Multiple Access (SC-FDMA), Discrete Fourier Transform Spread Orthogonal Frequency Division Multiplexing (DFT-SOFDM), Space-Division Multiplexing (SDM), Frequency-Division Multiplexing (FDM), Time-Division Multiplexing (TDM), Code Division Multiplexing (CDM), or others. The wireless communication system may support frequency division duplex (FDD) and time division duplex (TDD) modes.

The wireless communication system may transmit information using Medium Access Control (MAC) and Physical (PHY) layers. The techniques and systems described herein may be implemented in various wireless communication systems such as a system based on LTE, LTE-Advanced (LTE-A), GSM, CDMA, UMTS, Unlicensed Mobile Access (UMA), or others.

In the example LTE system shown in FIG. 1, the radio access network 110 includes eNB 112a and eNB 112b. Cell 114a is the service area of eNB 112a, and Cell 114b is the service area of eNB 112b. In this example, UEs 102a and 102b operate in Cell 114a and are served by eNB 112a. The UEs 102a and 102b can move around within the Cell 114a, or move across cells to Cell 114b. The UEs 102a and 102b may transmit voice data, video data, user data, application data, multimedia data, text, web content and/or any other content.

The UE 102a or 102b may be referred to as mobile electronic device, user device, mobile station, subscriber station, portable electronic device, mobile communications device, wireless modem, or wireless terminal. Examples of a UE (e.g. UE 102a or 102b) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The term "UE" can also refer to any hardware or software component that can terminate a communication session for a user. In addition, the terms "user equipment," "UE," "user equipment device," "user agent," "UA," "user device," and "mobile device" can be used synonymously herein.

Though described in terms of FIG. 1, the present disclosure is not limited to such an LTE environment.

Figure 2:
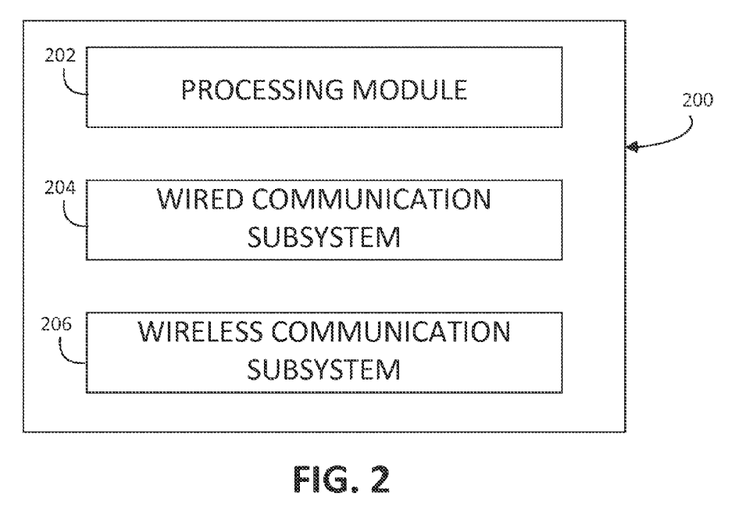
FIG. 2 is a schematic illustrating an example network node.

FIG. 2 is a schematic illustrating an example network node 200. The example network node 200 includes a processing module 202, a wired communication subsystem 204, and a wireless communication subsystem 206. The processing module 202 can include one or more processing components (also referred to as "processors" or "central processing units" (CPUs)) operable to execute instructions associated with managing uplink time alignment. The processing module 202 can also include other auxiliary components, such as random access memory (RAM), read only memory (ROM), secondary storage (for example, a hard disk drive or flash memory). The processing module 202 can execute certain instructions and commands to provide wireless or wired communication, using the wired communication subsystem 204 or a wireless communication subsystem 206. A skilled artisan will readily appreciate that various other components can also be included in the example network node 200.

A radio access network is part of a mobile communication system which implements a radio access technology, such as UMTS, CDMA2000 and 3GPP LTE. For example, the radio access network (RAN) 110 included in an LTE telecommunications system is called an EUTRAN. The EUTRAN can be located between the UEs and core network 120 (e.g. an evolved core network, EPC). The EUTRAN includes at least one eNB. The eNB can be a radio base station that may control all or at least some radio related functions in a fixed part of the system. The at least one eNB can provide radio interface within their coverage area or a cell for the UEs to communicate. The eNBs may be distributed throughout the cellular network to provide a wide area of coverage. The eNBs directly communicate with one or more UEs, other eNBs, and the core network.

Figure 3:
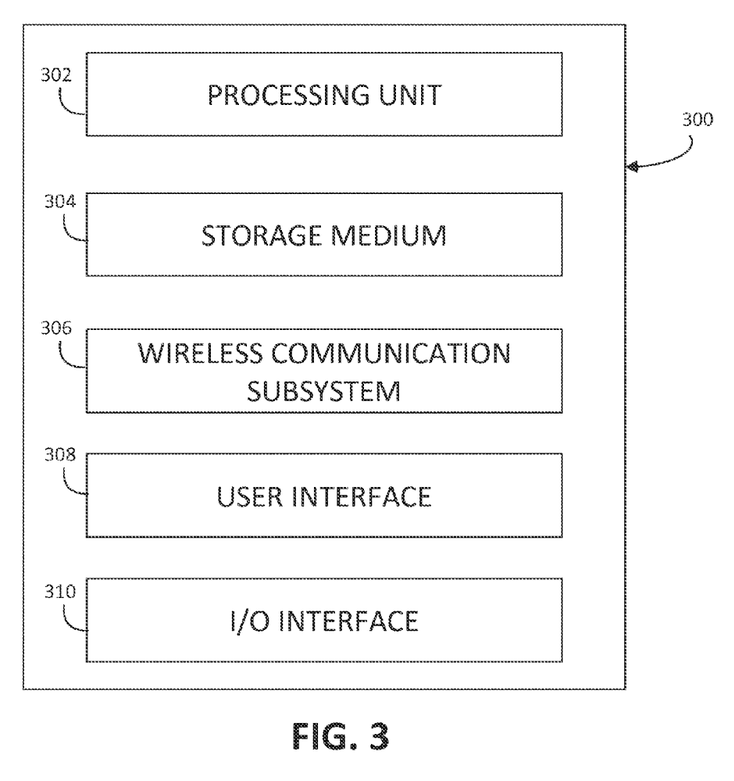
FIG. 3 is a schematic illustrating an example user equipment device.

FIG. 3 is a schematic illustrating an example UE apparatus. The example UE 300 includes a processing unit 302, a computer readable storage medium 304 (for example, ROM or flash memory), a wireless communication subsystem 306, a user interface 308, and an I/O interface 310. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some embodiments, the wireless communication subsystem 306 can support multiple input multiple output (MIMO) transmissions.

The user interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. A skilled artisan will readily appreciate that various other components can also be included in the example UE device 300.

The LTE system utilizes an orthogonal uplink multiple access scheme termed Single Carrier Frequency Division Multiplexing (SC-FDMA). The LTE uplink comprises three fundamental physical channels: PUSCH; PUCCH; PRACH;

and/or others. The PUSCH (Physical Uplink Shared Channel) is allocated dynamically to users within the cell by the eNB scheduler via its transmission of uplink grants on a Physical Downlink Control Channel (or PDCCH). The PUCCH (Physical Uplink Control Channel) comprises frequency resources at the upper and lower ends of the system bandwidth. Resources for a given UE on PUCCH are either semi-statically assigned by the eNB via RRC signaling, or for some purposes are implicitly allocated by the presence and location of a PDCCH (for example, HARQ ACK/NACK feedback for a downlink allocation may be sent on part of a shared pool of PUCCH resources, the specific portion used being associated with the location of the PDCCH). PUCCH may be used to send one or more of the following control information fields: CQI (Channel Quality Indicator); Hybrid Automatic Retransmission reQuest (HARQ) ACKnowledgment/Negative ACKnowledgment (ACK/NACK); PMI (Precoding Matrix Indicator); RI (Rank Indicator); PTI (Precoding Type Indicator); DSR (Dedicated Scheduling Request); SRS (Sounding Reference Signal); and/or others. Channel State Information (CSI) may include one or more of CQI, PMI, and RI, The PRACH (Physical Random Access Channel) comprises time and frequency resources set aside within the system for the purposes of receiving random-access preamble transmissions from UEs within the cell. In addition to the above physical channel types, there are also two uplink physical signals: DMRS and SRS. The DMRS (Demodulation Reference Signals) are embedded (time division multiplexed) into PUSCH and PUCCH transmissions to enable the receiver to estimate the radio channel through which the PUSCH or PUCCH has passed and to thereby facilitate demodulation. The SRS (Sounding Reference Signals) are also time division multiplexed (from the UE perspective) with other uplink physical channels and physical signals. SRS may be used by the base station to support a variety of radio link maintenance and control features, such as the above-mentioned frequency selective scheduling technique, radio link timing control, power control, and/or others.

Figure 4:
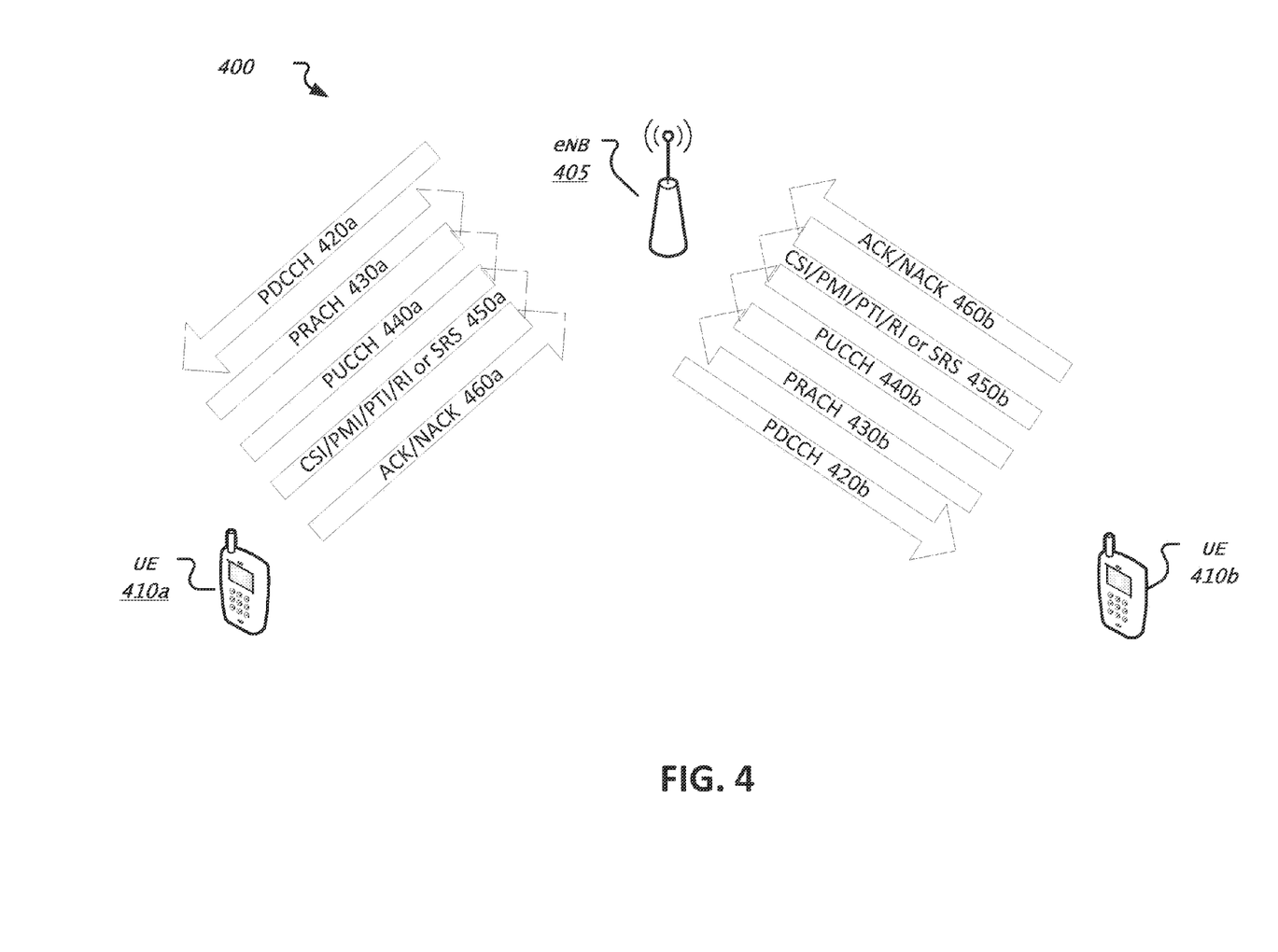
FIG. 4 is a schematic illustrating an example of signaling and traffic between a user equipment (UE) and a network node (e.g. an eNB).

FIG. 4 is a schematic diagram illustrating an example environment 400 of user equipment (UE) 410a and 410b communicating signal and signaling feedback to the network node 405 (e.g. eNB). In FIG. 4, the control elements PDCCH (420a and 420b) are transmitted to the UEs from the eNB while PRACH (430a and 430b), PUCCH (440a and 440b), and some related uplink control information (UCI), for example, CSI/PMI/PTI/RI or SRS (450a and 450b) and ACK/NACK (460a and 460b), are transmitted to the eNB from each UE.

A wireless device can transition between UE connection states, such as Radio Resource Control (RRC) connection modes. In the LTE system, two RRC connection modes exist, RRC connected and RRC idle. In an RRC connected mode, a dedicated radio connection and one or more radio access bearers are established to enable the transfer of user plane data and control plane data through a radio access network and onwards to the core network. In the RRC idle mode, a dedicated radio connection and radio access bearers are not established and user-plane data is not transferred. In some implementations, a limited degree of control signaling is possible in idle mode to enable the UE to establish a radio connection to the wireless network should a need for communications arise.

A wireless device, in an RRC-connected state, can use a DRX operational mode to conserve power by turning-off transceiver functionality, e.g., turning-off transceiver circuitry such as receiver circuitry. In some implementations, a wireless device ceases to monitor a wireless channel and, accordingly, ceases to operate a digital signal processor to decode wireless signals while in the DRX operational mode.

Figure 5:
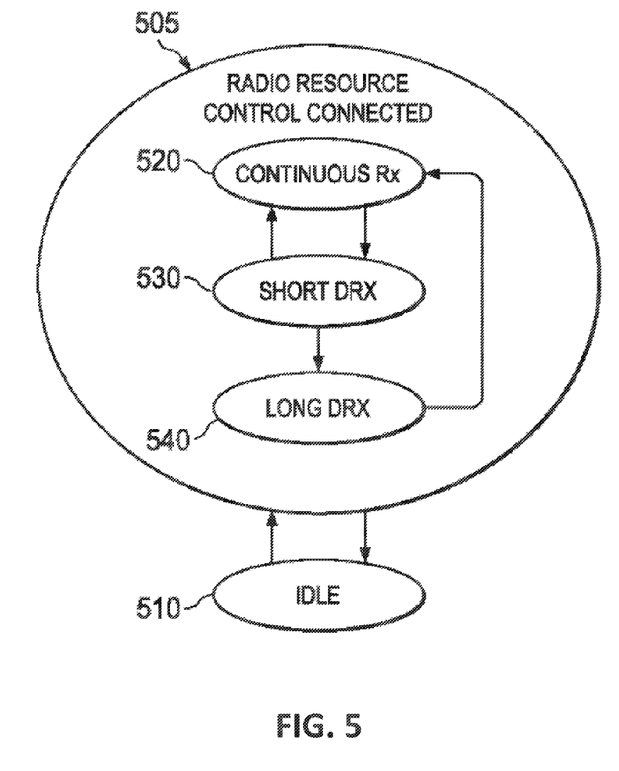
FIG. 5 is an example of a transition diagram for discontinuous reception while in Radio Resource Control (RRC) connected state.

FIG. 5 shows an example of a transition diagram for RRC connection states and DRX. RRC connection states include an RRC connected state 505 and an idle state 510. Transitions between the idle state 510 and the connected state 505 are effected via RRC connection establishment and release procedures. Such transitions can produce associated signaling traffic between a wireless device and a base station.

The RRC connected mode state 505 may be associated with a plurality of DRX sub-states (or DRX status) within the Medium Access Control (MAC) layer. The DRX sub-states (or DRX status) include a continuous reception (continuous-rx) state 520, a short DRX state 530, and a long DRX state 540. In the continuous reception state 520, a device may be continuously monitoring all or almost all downlink sub-frames for wireless traffic and can transmit data. In the short DRX state 530, the device can be controlled to turn off its receiver (e.g., sleep, or DRX) for all but Q out of N sub-frames. In the long DRX state 540, the device can be controlled to turn off its receiver (e.g., sleep, or DRX) for all but Q out of M sub-frames, where M is typically greater than N and M is typically an integer multiple of N. In one example, Q equals 1, N equals 8 and M equals 256. In an LTE-based system, a sub-frame is a 1 millisecond unit of transmission time.

In some implementations, an expiration of an inactivity timer causes a state transition (e.g., continuous reception state 520 to short DRX state 530 or short DRX state 530 to long DRX state 540). Resumption of activity, such as the device having data to transmit or receiving new data, can cause a transition from a DRX state 530, 540 to the continuous reception state 520. In some implementations, a base station sends a MAC control element that causes a transition from the continuous reception state 520 to one of the DRX states 530, 540. In other words, MAC control element may also be used by the network (sent from eNB to the UE) in order to explicitly direct a transition to a different DRX sub-state with a longer DRX cycle. A resumption of data activity typically results in a transition to the continuous reception sub-state.

Figure 6:
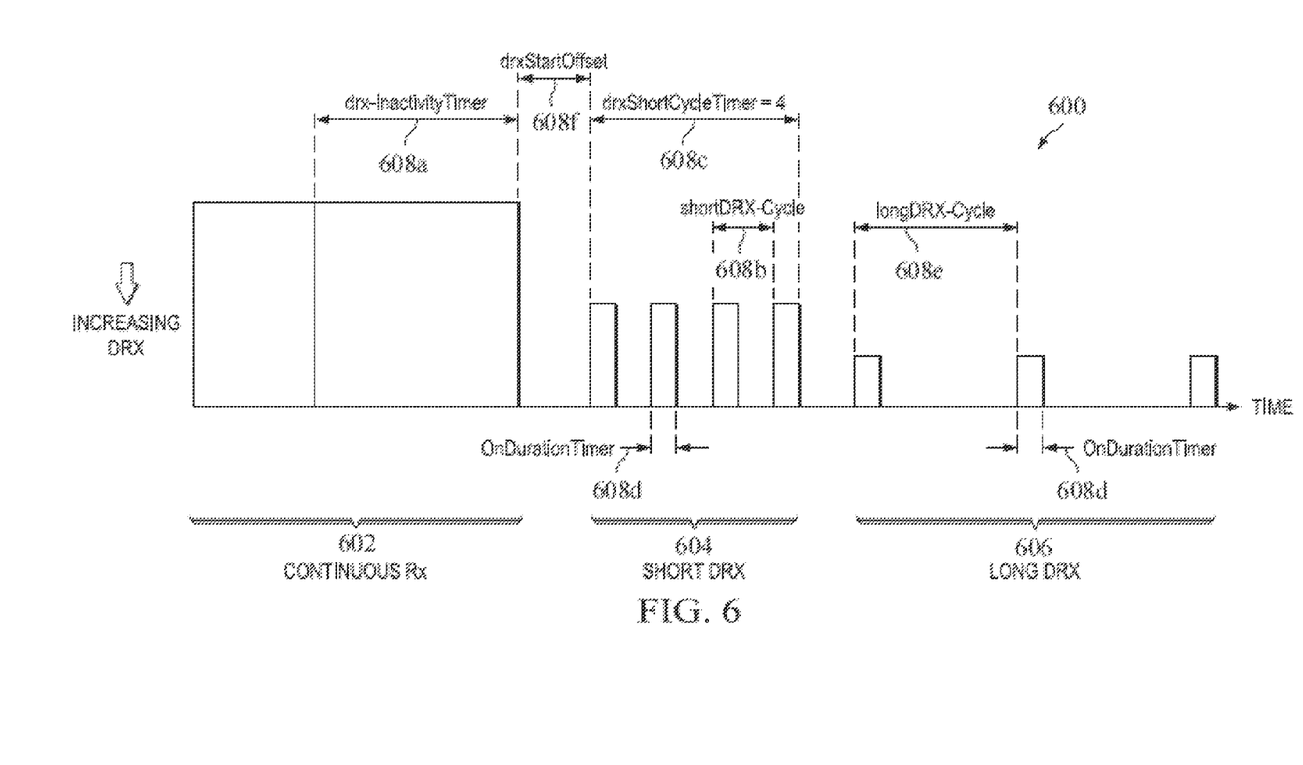
FIG. 6 is a schematic illustrating an example of different reception patterns.

FIG. 6 is a schematic diagram 600 illustrating the different reception patterns and associated parameters. In particular, the diagram 600 includes the Continuous Rx 602, short DRX 604, and Long DRX 606. Within RRC Connected Mode, the DRX reception patterns 604 and 606 (defined at the sub-frame level in the time domain) may be controlled by the network assigning various timers and parameters to the UE. The following parameters, defined in 3GPP technical specification 36.321, may determine the DRX patterns 604 and 606: drx-InactivityTimer 608a; shortDRX-Cycle 608b; drx-ShortCycleTimer 608c; onDurationTimer 608d; longDRX-Cycle 608e; drxStartOffset 608f; and/or others. The drx-InactivityTimer parameter 608a is the time the UE remains in continuous-Rx mode after reception of the last new packet. The shortDRX-Cycle 608b parameter is the fundamental period of the short DRX pattern/duty-cycle. The drxShortCycleTimer parameter 608c is the number of fundamental periods of the short DRX cycle that the UE will remain in short DRX for (if inactivity continues) before transitioning to Long DRX. The onDurationTimer parameter 608d is the number of sub-frames for which the UE is "awake" at the start of each DRX cycle fundamental period. The longDRX-Cycle parameter 608e is the fundamental period of the long DRX pattern/duty-cycle. The drxStartOffset parameter 608f defines the subframe offset for the start of the DRX cycle patterns in short and long DRX. The total length of time that a UE will remain in short DRX when inactive is equal to (shortDRX-Cycle * drxShortCycleTimer) ms.

In cell 114a, the transmissions from the eNB 112a to the UE 102a or 102b are referred to as downlink transmissions, and the transmissions from the UEs 102a or 102b to the eNB 112a are referred to as uplink transmissions. The signal transmissions from the multiple UEs 102a and 102b in a cell 114a may go through different paths and experience different propagation delays to arrive at the eNB 112a. In some instances, the UE 102a or 102b may move towards or away from the eNB 112a. Changes in distance or propagation environment may also cause the propagation delay to vary between the UE 102a or 102b and the eNB 112a. To counteract multiple propagation delays among multiple UEs, the timing of uplink transmissions from multiple UEs may need to be aligned at the receiver of the eNB.

An absence of time alignment may cause significant interference to other uplink users (i.e., a loss of uplink orthogonality of the multiple access scheme which may cause intra-cell interference occurring, both between UEs assigned to transmit in consecutive subframes and between UEs transmitting on adjacent subcarriers.). For this reason, users may not transmit on orthogonal uplink resources (PUCCH, PUSCH, SRS) until time alignment has first been established. This alignment may be achieved using transmission of a non-time-aligned preamble on the PRACH (the PRACH may not be an orthogonal resource). The eNB may measure the time of arrival error of the UE's PRACH transmission and sends a timing advance command that may bring the UE into time alignment with other uplink users. Once completed, the eNB may then consider that the time-aligned UE is permitted to use orthogonal uplink resources such as PUCCH, PUSCH and SRS.

Figure 7:
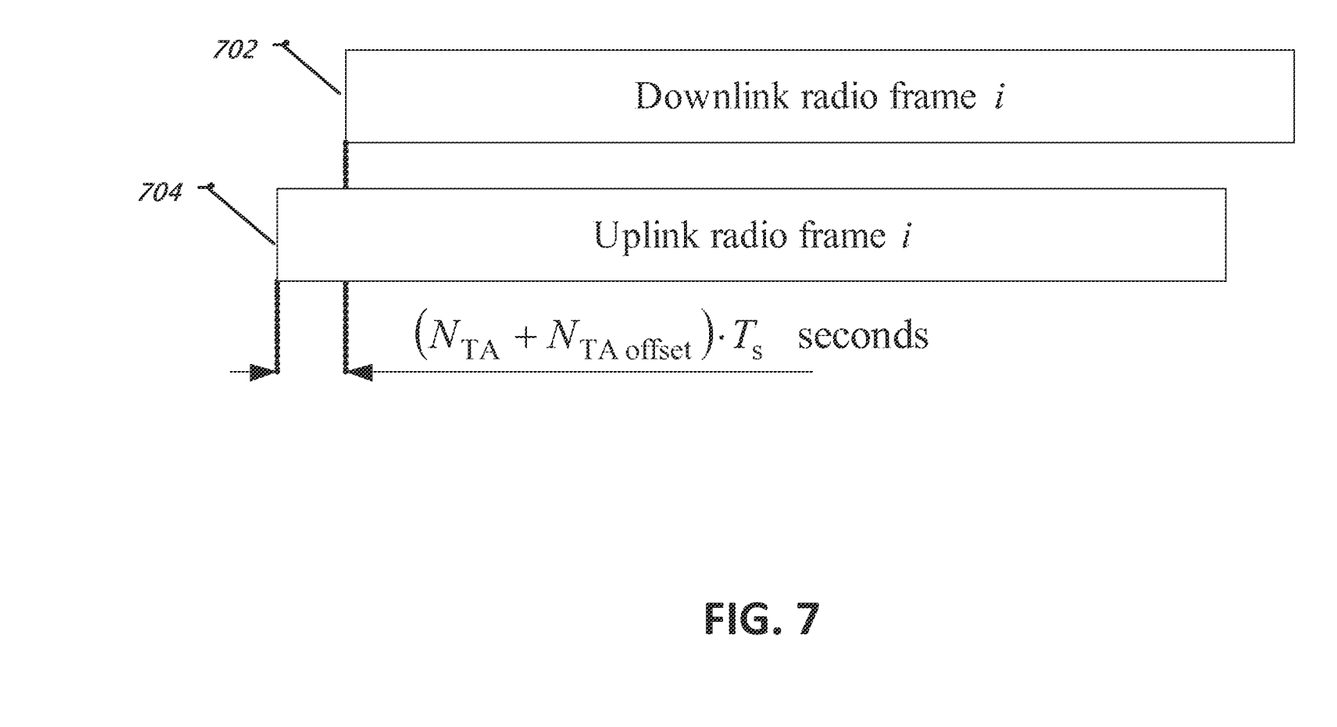
FIG. 7 is a schematic illustrating an example of uplink-downlink timing relation.

FIG. 7 is one embodiment of a typical uplink-downlink timing relation illustrated in 3GPP LTE. Transmission of the uplink radio frame number i 702 from the UE starts ($N_{TA}$+ $N_{TA\ offset}$)×$T_s$ seconds before the start of the corresponding downlink radio frame 704 at the UE, where $0 \leq N_{TA} \leq 20512$, $N_{TA\ offset}=0$, for frame structure type 1 and $N_{TA\ offset}=624$ for frame structure type 2. Ts is the basic time unit $T_s=1/(15000\times 2048)$ second as specified in 3rd Generation Partnership Project (3GPP) Technical Specification (TS) 36.211. Note that not all slots in a radio frame may be transmitted. One example is TDD, where only a subset of the slots in a radio frame is transmitted.

In some embodiments, during the random access procedure, the UE is given the absolute timing advance value to set $N_{TA}$. The UE is provided the timing advance value for the adjustment of $N_{TA}$ by Timing Advance Command MAC Control Element (TAC MAC CE) as specified in section 4.2.3 of 3GPP TS36.213.

In some embodiments, upon reception of a timing advance command, the UE shall adjust its uplink transmission timing for PUCCH/PUSCH/SRS of the primary cell. The timing advance command indicates the change of the uplink timing relative to the current uplink timing as multiples of 16 $T_s$. The uplink transmission timing for PUSCH/SRS of a secondary cell is the same as the primary cell.

In case of random access response, 11-bit timing advance command, $T_A$, indicates $N_{TA}$ values by index values of $T_A=0$, 1, 2, . . . , 1282, where an amount of the timing advance is given by $N_{TA}=T_A\times 16$. $N_{TA}$ is defined in 3GPP TS36.133.

In other cases, 6-bit timing advance command, $T_A$, indicates a relative adjustment of the current $N_{TA}$ value, $N_{TA,old}$, to the new $N_{TA}$ value, $N_{TA,new}$, by index values of $T_A=0$, 1, 2, . . . , 63, where $N_{TA,new}=N_{TA,old}+(T_A-31)\times 16$. Here, adjustment of $N_{TA}$ value by a positive or a negative amount indicates advancing or delaying the uplink transmission timing by a given amount respectively.

For a timing advance command received on subframe n, the corresponding adjustment of the timing can apply from the beginning of subframe n+6. When the UE's uplink PUCCH/PUSCH/SRS transmissions in subframe n and subframe n+1 are overlapped due to the timing adjustment, the UE may transmit complete subframe n and may not transmit the overlapped part of subframe n+1.

To maintain time alignment, in some embodiments, ongoing timing advance commands may be sent by the eNB. These commands may be sent as determined by the eNB or a periodic update methodology can be implemented by the eNB. Each time a timing advance command is sent on the downlink to the UE, the UE may restart a timer known as the "Time Alignment Timer" or TAT. From higher layer perspective, the UE considers it is in uplink synchronization when the time alignment timer (TAT) is running. The timer represents the amount of time the UE is expected to be able to maintain uplink synchronization. The timer starts when the UE receives the timing advance command. Once alignment has been lost, the UE will need to regain alignment when it next needs to transmit. The TAT increments in time until being restarted due to the arrival of a new timing command. If the TAT reaches a certain threshold value (i.e., the timer "expires"), the UE may be out of synchronization and no longer transmit on orthogonal uplink resources.

The TAT may also expire while longer-term (or semi-static) uplink resources (such as periodic PUCCH resource for CQI or periodic resources for SRS) are assigned to the UE. If present, such resources may have been previously assigned via RRC signaling (e.g., at the start of a period of activity). In this event, the 3GPP LTE standard mandates that (on TAT expiry) the UE may release all pre-assigned PUCCH and SRS resources.

Figure 8:
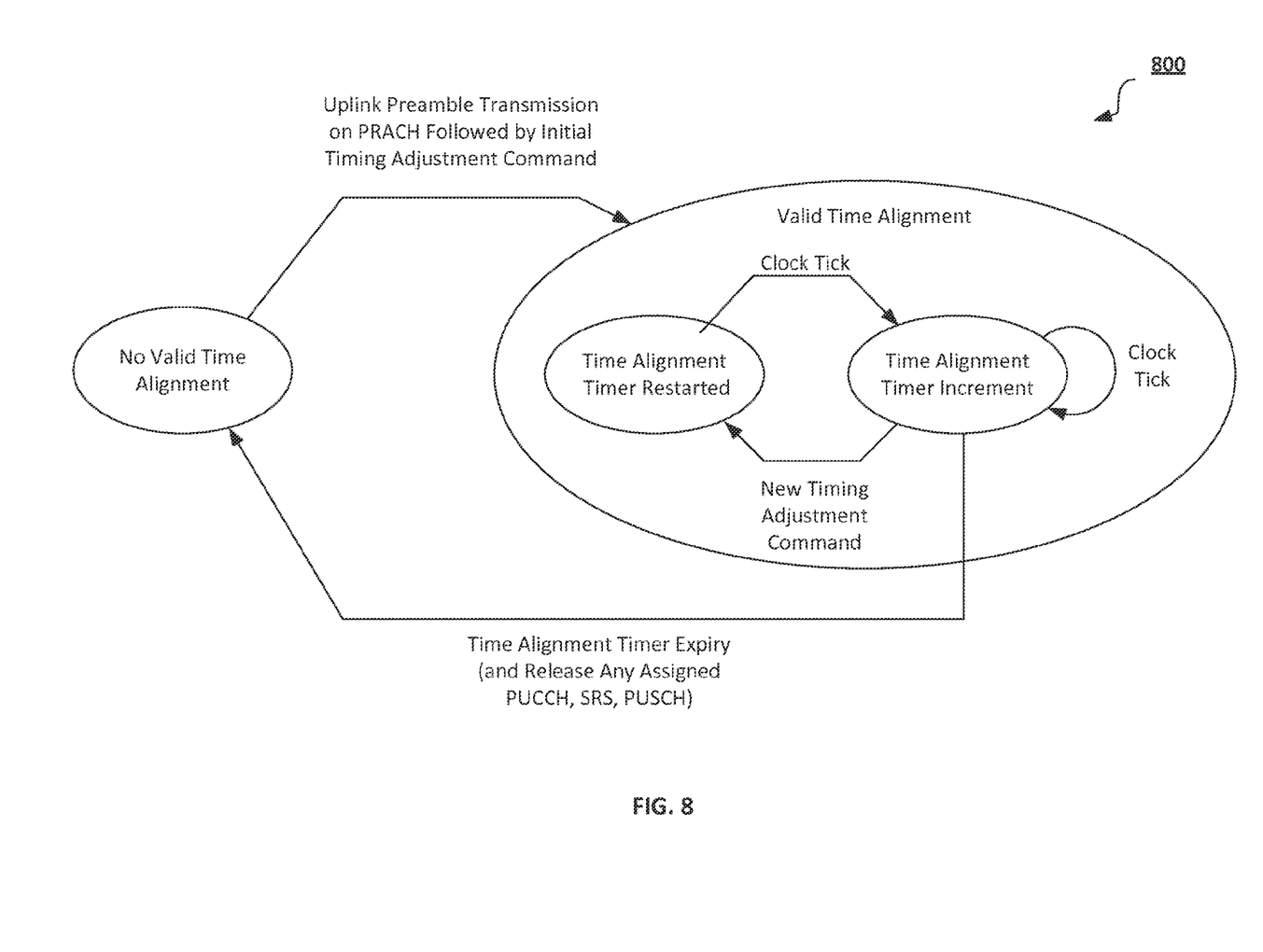
FIG. 8 is a schematic illustrating time alignment between wireless devices and network nodes.

FIG. 8 is a schematic diagram 800 illustrating an overview of the time alignment sub-states as maintained, in some implementations, synchronously by eNB and UE. The expiry threshold for the TAT may be a configurable value which is communicated to the UE. The value may be set and controlled by the eNB and may be defined in Release 8 of the 3GPP standard to be one from the set of {0.5, 0.75, 1.28, 1.92, 2.56, 5.12, 10.24 and Infinity} seconds.

In some embodiments, based on received timing of SRS, CQI, the eNB corrects or adjusts the UE transmission timing by sending TAC MAC CE so that the signal from the UE arrives at the eNB in a certain time window. The eNB may inform the UE of the timer value and the timer is started or restarted by the reception of a timing advance command (TAC).

In some embodiments, if the received downlink timing changes and is not compensated or is only partly compensated by the uplink timing adjustment without timing advance, the UE changes $N_{TA}$ accordingly as specified in 3GPP TS36.133. In another embodiment, the uplink timing can be adjusted partially without TAC MAC CE to maintain the timing error of UE transmission with in a predetermined threshold.

In the context of LTE, a relevant extract of procedural text from 3GPP TS 36.321 is for maintenance of uplink time alignment is:
"The UE shall:
   when a Timing Advance Command MAC control element is received:
     apply the Timing Advance Command;
     start or restart timeAlignmentTimer.

when a Timing Advance Command is received in a Random Access Response message:
  if the Random Access Preamble was not selected by UE MAC:
    apply the Timing Advance Command;
    start or restart timeAlignmentTimer.
  else, if the timeAlignmentTimer is not running:
    apply the Timing Advance Command;
    start timeAlignmentTimer;
      when the contention resolution is considered not successful as described in subclause 5.1.5, stop timeAlignmentTimer.
  else:
    ignore the received Timing Advance Command.
when timeAlignmentTimer expires:
  flush all HARQ buffers;
  notify RRC to release PUCCH/SRS;
  clear any configured downlink assignments and uplink grants.
The UE shall not perform any uplink transmission except the Random Access Preamble transmission when timeAlignmentTimer is not running"

According to the above maintenance procedure of uplink time alignment, upon reception of TAC MAC CE the UE applies the Timing Advance Command and starts or restarts the Time Alignment Timer (TAT). It may be interpreted that a UE in unsynchronised state can be uplink resynchronised by processing TAC MAC CE without performing the random access procedure. However, a UE may not know how to perform uplink timing adjustment based on the TA Command MAC CE and the old uplink timing because the UE may not store the information of old uplink timing after TA timer expiry.

Some Release 8 and 9 UE implementations discard $N_{TA}$ value upon TAT expiry. If TAC MAC CE is applied to such UEs for uplink resynchronisation, the resultant uplink timing may be unreliable. Therefore it was commonly understood that the eNB should avoid applying TAC MAC CE for uplink resynchronisation of Release 8 and 9 UEs.

With respect to release 11 UEs, it is agreed that to add the following note in the 3GPP MAC specification: "A UE stores $N_{TA}$ upon expiry of associated timeAlignmentTimer." "The UE applies a received Timing Advance Command MAC control element and starts associated timeAlignmentTimer also when the timeAlignmentTimer is not running" Thus, the UE should remember the uplink timing upon TAT expiry in order to ensure that uplink timing is reliable after TAC is applied. Three scenarios (shown below) can be identified when TAC MAC CE can be utilized for uplink resynchronization.

Error recovery scenario
  When TAT is expired because transmission of TAC MAC CE is delayed or missed by the UE, transmitting TAC MAC CE is more efficient than triggering random access procedure to achieve uplink resynchronisation. It can be understood that TAC MAC CE should be transmitted by the eNB soon after the eNB detects TAT expiry in the UE.
Small cell scenario
  In a small cell whose radius is smaller than half a TA step, i.e. roughly 78 meters, then no adjustment is required, i.e. TAT can be set to infinity. For battery saving purposes, TAT can be set to a small value. In this case uplink control signal transmission will be stopped upon TAT expiry, in such a case TAC MAC CE with value of 31 (no adjustment) can be used to resynchronise the UE.
Stationary UE scenario:
  Uplink timing adjustment is not required when the UE is stationary.

According to section 7.1.2 of 3GPP TS36.133, the UE initial transmission timing error shall be less than or equal to $\pm T_e$ where the timing error limit value $T_e$ is specified in Table 1. This requirement applies when it is the first transmission in a DRX cycle for PUCCH, PUSCH and SRS or it is the PRACH transmission. The reference point for the UE initial transmit timing control requirement can be the downlink timing minus $(N_{TA\_Ref}+N_{TA\_offset})\times T_s$. The downlink timing may be defined as the time when the first detected path (in time) of the corresponding downlink frame is received from the reference cell. $N_{TA\_Ref}$ for PRACH may be defined as 0. $(N_{TA\_Ref}+N_{TA\_offset})$ (in $T_s$ units) for other channels is the difference between UE transmission timing and the downlink timing immediately after when the last timing advance was applied. $N_{TA\_Ref}$ for other channels is not changed until next timing advance is received.

TABLE 1

| $T_e$ Timing Error Limit | |
|---|---|
| Downlink Bandwidth (MHz) | $T_{e\_}$ |
| 1.4 | 24 * $T_S$ |
| ≥3 | 12 * $T_S$ |

Note:
$T_S$ is the basic timing unit defined in TS 36.211

When it is not the first transmission in a DRX cycle or there is no DRX cycle, and when it is the transmission for PUCCH, PUSCH and SRS transmission, the UE may be capable of changing the transmission timing according to the received downlink frame except when the timing advance is applied. When the transmission timing error between the UE and the reference timing exceeds $\pm T_e$, the UE may be required to adjust its timing to within $\pm T_e$. The reference timing may be $(N_{TA\_Ref}+N_{TA\_offset})\times T_s$ before the downlink timing. In the 3GPP specifications, all adjustments made to the UE uplink timing follow these rules:
  1) The maximum amount of the magnitude of the timing change in one adjustment shall be $T_q$ seconds.
  2) The minimum aggregate adjustment rate shall be 7*$T_s$ per second.
  3) The maximum aggregate adjustment rate shall be $T_q$ per 200 ms.
The maximum autonomous time adjustment step $T_q$ is specified in Table 2.

TABLE 2

| $T_q$ Maximum Autonomous Time Adjustment Step | |
|---|---|
| Downlink Bandwidth (MHz) | $T_{q\_}$ |
| 1.4 | [17.5 * $T_S$] |
| 3 | [9.5 * $T_S$] |
| 5 | [5.5 * $T_S$] |
| ≥10 | [3.5 * $T_S$] |

Note:
$T_S$ is the basic timing unit defined in 3GPP TS 36.211

Figure 9:
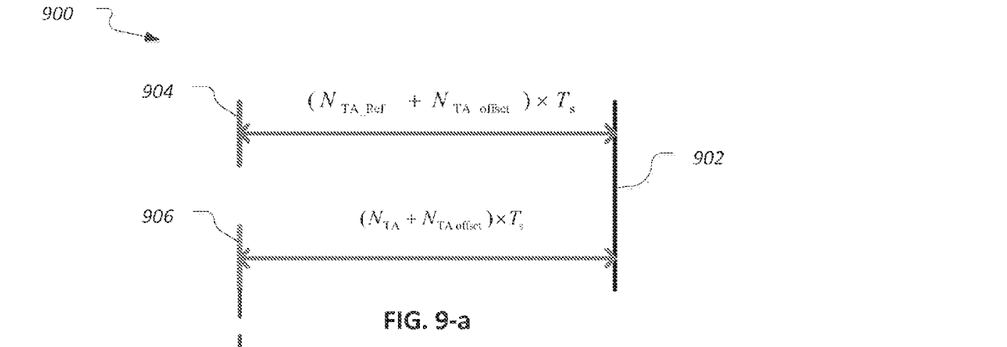
FIG. 9*a-c* is a schematic illustrating an example time chart for timing advance adjustment upon received downlink timing changes.

FIG. 9 is a schematic 900 showing an example of UE transmission timing and $N_{TA}$ adjustment upon received downlink timing changes. Specifically, FIG. 9-a is a timing chart of UE just after a timing advance command (TAC) has been applied, where 902 is received downlink timing and 904 is the reference time. Based on section 4.2.3 of TS 36.213, upon reception of the TAC, the UE may adjust its uplink transmission timing 906 to $(N_{TA}+N_{TA\_offset}) \times T_s$ ahead of the downlink timing 902 and restart TAT. $N_{TA\_Ref}$ is equal to $N_{TA}$ in this case.

When the UE moves towards the cell edge, as shown in FIG. 9-b, the received downlink timing 908 may arrive, say, one time unit, later relative to the downlink timing 902 in FIG. 9-a. According to section 7.1.2 of TS 36.133, the UE is required to adjust its timing to within $\pm T_e$ when the transmission timing error between the UE transmission time 906 and the reference timing 910 exceeds $\pm T_e$. In order to keep the transmission timing error less than or equal to $\pm T_e$, the UE adjusts its transmission timing 912 accordingly where a duration of 914 is the UE transmission timing adjustment. The UE also adjusts the $N_{TA}$ to $N_{TAadjusted}$ according to section 4.2.3 of TS 36.213. The adjustment of $N_{TA}$ value is equal to the amount of the transmission timing error after the transmission timing adjustment which is shown as 916.

When TAT is not running, there is no PUCCH, PUSCH and SRS transmission. Therefore no uplink timing adjustment is performed according to section 7.1.2 of 3GPP TS36.133 and received downlink timing changes is not compensated. The UE may store $N_{TA}$ upon expiry of associated TAT. Following section 4.2.3 of TS36.213, the UE changes $N_{TA}$ accordingly if a downlink timing change is not compensated. It is not clear whether this change should be reflected to the stored $N_{TA}$ as well.

One approach is not changing the stored $N_{TA}$ according to the received downlink timing. However, this approach may increase the uplink timing error when a timing advance command is applied for uplink resynchronization.

Another solution is that the UE may change the stored $N_{TA}$ value according to the received downlink timing as specified in 3GPP TS 36.213. In some embodiments, a UE can store $N_{TA}$ upon expiry of associated timeAlignmentTimer. The UE applies a received Timing Advance Command MAC control element and starts associated timeAlignmentTimer also when the timeAlignmentTimer is not running. The UE may change the stored $N_{TA}$ value based on the received downlink timing changes as defined in TS 36.213.

In another embodiment, a UE may maintain or continue to adjust $N_{TA}$ according to 3GPP TS 36.213 upon expiry of associated timeAlignmentTimer. The UE applies a received Timing Advance Command MAC control element and starts associated timeAlignmentTimer also when the timeAlignmentTimer is not running.

FIG. 9-c is a schematic showing an example time chart with UE uplink timing adjustment with and without changing a stored $N_{TA}$ value. Assume that timeAlignmentTimer expires after FIG. 9-b where the UE has adjusted the transmission timing and adjusted the $N_{TA}$ value to $N_{TAadjusted}$. The UE stores $N_{TAadjusted}$—in this case, $N_{TAstored}=N_{TAadjusted}$. If the UE moves further towards the cell edge, the received downlink timing 920 may arrive one time unit later (in this example) than the downlink timing 908 in FIG. 9-b (though it is understood that the downlink timing may, in general, arrive at a certain amount of time later or earlier, depending on the direction of movement of the UE). The new reference time 922 can be $(N_{TA\_Ref}+N_{TA\_offset}) \times T_s$ ahead of the downlink timing 920. At this time, the UE has not adjust transmission timing. However, the UE may further change the $N_{TAadjusted}$ to $N_{TAfurther\_adjusted}$ accordingly based on the new downlink timing 920. Specifically, in this example, the $N_{TAfurther\_adjusted}$ is equal to $N_{TAadjusted}$ plus one time unit—the change in the DL transmission timing—in order to keep the UE transmission timing approximately the same relative to the reference timing 904 upon resumption of uplink synchronization for example by the TAC being applied.

After TAT expiry, the UE does not adjust the transmission timing 924. A transmission timing error between the UE transmission timing 924 and the new reference time 922 is shown as 926. Note that an ideal UE transmission timing with compensation of UE mobility would be 928, two time units ahead of the reference timing 904 upon the TAC being applied in this example. When the UE transmits at the ideal transmission time 928, the signal would arrive within the demodulation window or processing window of the base station or evolved Node B to maintain orthogonality with other transmitting UEs. An uplink timing error between the ideal timing 928 and the UE transmission timing 924 after the UE further adjusts the stored $N_{TA}$ value is shown as 930. However, if the UE merely uses $N_{TAstored}$ without further adjustment, the UE transmission timing may be 932, $(N_{TAstored}+N_{TA\_offset}) \times T_s$ ahead of downlink timing 920. The uplink timing error 934 between the UE transmission timing 932 and the ideal timing 928 is larger than that shown as 930 where the stored timing advance value is adjusted. In one particular example scenario, the error corresponding to the approach without adjustment of the stored timing advance value could be twice as much as the error corresponding to the solution with adjustment of the stored timing advance value. In order to reduce uplink timing error upon applying TAC MAC CE, the UE may adjust stored timing advance value when TAT is not running or when downlink timing change is not compensated. In some implementations, the UE may maintain or may continue to adjust the time advance value upon TAT expires or when downlink timing change is not compensated.

Figure 10:
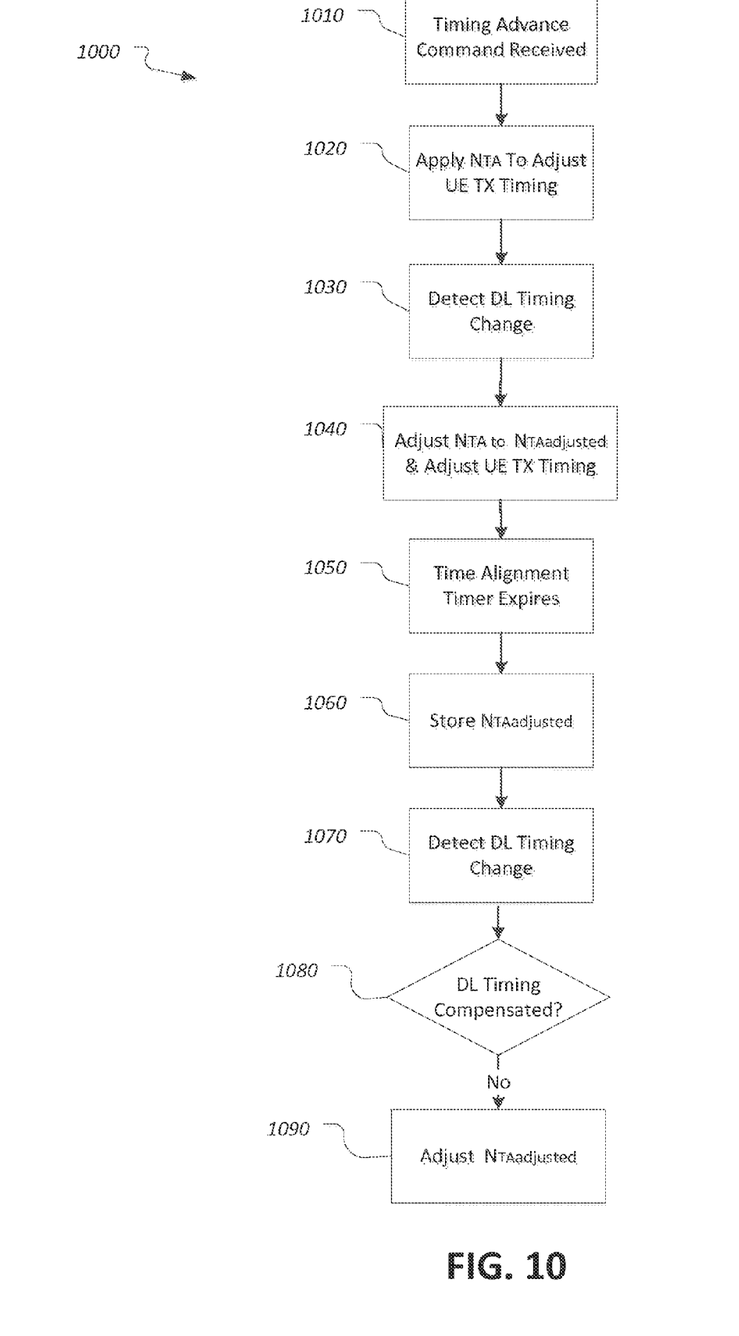
FIG. 10 is a flow chart illustrating an example process for timing advance adjustment upon received downlink timing changes.

FIG. 10 is a flow chart 1000 illustrating an embodiment process in accordance with the above solution for $N_{TA}$ adjustment upon received downlink timing changes. The process may be performed by the UE. Upon the reception of a timing advance command (TAC) (1010), the UE, based on a first $N_{TA}$ value, can apply the timing advance adjustment to the UE uplink transmission timing relative to a downlink timing (1020). In some embodiments, due to UE mobility, the UE may detect that a downlink transmission timing has changed by an amount of time (1030). The UE can change the transmission timing (not shown) and adjust the timing advance accordingly. More specifically the first $N_{TA}$ value to $N_{TAadjusted}$ (1040). When associated TAT expires (1050), the UE can store the current timing advance value $N_{TAadjusted}$ (1060). When the UE detects another change in the downlink transmission timing (1070), if the UE determines that the TAT is not running or the downlink transmission timing change is not compensated for (1080), the UE may not change its transmission timing but further change the stored timing advance value $N_{TAadjusted}$ based on the amount of time that downlink transmission timing has changed (1090).

In order to carry out the above method, the UE, e.g. 300 in FIG. 3, contains a processor capable of performing the above process. For example, the wireless communications subsystem 306 can contain an antenna and a transceiver capable to receive a timing advance command (TAC). The processing module 302 may include one or more processing components. The processing components are operable to, for instance, receive an indication that downlink transmission timing has changed by an amount of time, determine whether a time alignment timer (TAT) is running or not, and adjust a timing advance based on the amount of time that the downlink transmission timing has changed to define an adjusted timing advance. Some processing components may be operable to apply the adjusted timing advance to uplink transmission timing. Certain processing components are related to TAT, for instance, operable to start or restart TAT based on TAC received from the wireless communications subsystem 306, or store the timing advance after expiration of the TAT.

In some aspects of implementations, the TAC might be received in a TAC Medium Access Control (MAC) control element (CE), or in a Random Access (RA) Response (RAR) message.

In this disclosure, "start TAT" may be interpreted as "restart TAT" wherever applicable.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps not implied by the order they appear in the claims.

A method, performed at a User Equipment (UE) of a wireless communications network, the method comprises detecting a downlink transmission timing has changed by an amount of time, determining that a time alignment timer (TAT) is not running or determining that the downlink transmission timing change is not compensated for, and adjusting a timing advance based on the amount of time that the downlink transmission timing has changed.

Upon expiration of the TAT, store the timing advance. Adjusting the stored timing advance is based on the amount of time that downlink transmission timing has changed. Start the TAT upon application of the TAC received in the timing advance command (TAC) medium access control (MAC) control element (CE). Adjust the uplink transmission timing to a new uplink transmission timing that is equal to the sum of a stored time advance and the adjusted time advance. Determine that the TAT is not running comprises determining that the TAT has expired. Apply the adjusted timing advance to an uplink transmission timing.

A user equipment of a wireless communications network, the user equipment comprises an antenna, a transceiver, and a processor configured to: detect a downlink transmission timing has changed by an amount of time, determine that a time alignment timer (TAT) is not running or determining the downlink transmission timing change is not compensated, and adjust a timing advance based on the amount of time that the downlink transmission timing has changed.

The processor is further configured to store the timing advance after expiration of the TAT. Adjusting the stored timing advance is based on the amount of time that downlink transmission timing has changed. The processor is further configured to restart the TAT upon application of the TAC received in the TAC MAC CE. Determining that the TAT is not running comprises determining that the TAT has expired. The processor is further configured to apply the adjusted timing advance to an uplink transmission timing.

What is claimed is:

1. A method, performed at a User Equipment (UE) of a wireless communications network, the method comprising:
   detecting that a downlink transmission timing has changed by an amount of time;
   determining that a time alignment timer (TAT) is not running; and
   while the TAT is not running, adjusting a timing advance for uplink transmissions based on the amount of time that the downlink transmission timing has changed, wherein the timing advance for uplink transmissions was stored in memory at expiration of the TAT.

2. The method of claim 1, further comprising starting the TAT upon application of a timing advance command (TAC) received in a TAC medium access control (MAC) control element (CE).

3. The method of claim 2, further comprising adjusting the uplink transmission timing to a new uplink transmission timing that is equal to the sum of the maintained timing advance and a timing advance received in the TAC MAC CE.

4. The method of claim 1, wherein determining that the TAT is not running comprises determining that the TAT has expired.

5. The method of claim 1, further comprising applying the adjusted timing advance to an uplink transmission timing.

6. A user equipment of a wireless communications network, the user equipment comprising:
   an antenna;
   a transceiver; and
   a processor configured to:
      detect a downlink transmission timing has changed by an amount of time;
      determine that a time alignment timer (TAT) is not running; and
      while the TAT is not running, adjust a timing advance for uplink transmissions based on the amount of time that the downlink transmission timing has changed, wherein the timing advance for uplink transmissions was stored in memory at expiration of the TAT.

7. The UE of claim 6, wherein the processor is further configured to start the TAT upon application of a timing advance command (TAC) received in the TAC medium access control (MAC) control element (CE).

8. The UE of claim 6, wherein determining that the TAT is not running comprises determining that the TAT has expired.

9. The UE of claim 6, further comprising applying the adjusted timing advance to an uplink transmission timing.

10. The UE of claim 7, further comprising adjusting the uplink transmission timing to a new uplink transmission timing that is equal to the sum of the adjusted timing advance and and a timing advance received in the TAC MAC CE.

11. A non-transitory computer readable medium storing instructions to cause a processor to perform operations comprising:
   detecting that a downlink transmission timing has changed by an amount of time;
   determining that a time alignment timer (TAT) is not running; and
   while the TAT is not running, adjusting a timing advance for uplink transmissions based on the amount of time that the downlink transmission timing has changed, wherein the timing advance for uplink transmissions was stored in memory at expiration of the TAT.

12. The computer readable medium of claim 11, the instructions further comprising starting the TAT upon application of a timing advance command (TAC) received in a TAC medium access control (MAC) control element (CE).

13. The computer readable medium of claim 12, the instructions further comprising adjusting the uplink transmission timing to a new uplink transmission timing that is equal to the sum of the maintained timing advance and a timing advance received in the TAC MAC CE.

14. The computer readable medium of claim 11, wherein the instructions comprising determining that the TAT is not running comprises the instructions further comprising determining that the TAT has expired.

15. The computer readable medium of claim 11, the instructions further comprising applying the adjusted timing advance to an uplink transmission timing.

* * * * *